United States Patent
Bulgakov et al.

(10) Patent No.: US 7,491,751 B2
(45) Date of Patent: Feb. 17, 2009

(54) METHOD FOR PROCESSING POLYESTER WASTES

(75) Inventors: Viktor Bulgakov, Puschino (RU); Levan Dadiani, Boleslav (CZ); George Javakhishvili, Tbilisi (GE)

(73) Assignee: PTP Plastic Technologies and Products B.V., Amsterdam (NL)

( * ) Notice: Subject to any disclaimer, the term of this patent is extended or adjusted under 35 U.S.C. 154(b) by 454 days.

(21) Appl. No.: 10/515,012

(22) PCT Filed: Oct. 16, 2002

(86) PCT No.: PCT/CZ02/00055

§ 371 (c)(1), (2), (4) Date: Aug. 25, 2005

(87) PCT Pub. No.: WO03/104314

PCT Pub. Date: Dec. 18, 2003

(65) Prior Publication Data

US 2006/0094793 A1    May 4, 2006

(30) Foreign Application Priority Data

May 23, 2002  (CZ) ................................ 2002-1799

(51) Int. Cl.
*C08J 11/04*   (2006.01)
*C08G 63/00*   (2006.01)

(52) U.S. Cl. .................. 521/48; 264/176.1; 264/219; 524/94; 524/381; 524/404; 525/418; 525/437; 525/438; 525/444; 525/464; 528/15; 528/31; 528/32; 528/35; 528/271; 528/272; 528/480

(58) Field of Classification Search ............. 264/176.1, 264/219; 525/418, 437, 438, 444, 464; 524/94, 524/381, 404; 528/15, 31, 32, 35, 271, 272, 528/480; 521/48

See application file for complete search history.

(56) References Cited

U.S. PATENT DOCUMENTS

| | | | | |
|---|---|---|---|---|
| 4,048,103 A | * | 9/1977 | Graham | ............ 428/63 |
| 4,305,864 A | * | 12/1981 | Griffin et al. | ......... 524/601 |
| 5,395,858 A | | 3/1995 | Schwartz, Jr. | |
| 5,432,006 A | * | 7/1995 | Kessel et al. | ......... 428/447 |
| 5,563,222 A | * | 10/1996 | Fukuda et al. | ........ 525/437 |
| 5,580,905 A | | 12/1996 | Schwartz, Jr. | |
| 5,876,644 A | * | 3/1999 | Nichols et al. | ........ 264/101 |
| 2002/0006487 A1 | * | 1/2002 | O'Connor et al. | ..... 428/35.7 |

FOREIGN PATENT DOCUMENTS

| | | |
|---|---|---|
| CZ | PV2001-926 | 11/2001 |
| EP | 0 794 216 A | 9/1997 |
| JP | 60245629 | * 12/1985 |
| WO | WO 00 18830 A | 4/2000 |

OTHER PUBLICATIONS

Article—Titled: The Role of Additives in the solid State Polycondensation of Recycled Polyethylene Terephthalate (PET) in ARC'96 Technology The Spark in Recycling Publication, Nov. 7, 8, 1996—Authors—Ulrich B. Steiner and Camille Borer.*
International Search Report dated Apr. 29, 2003 issued in corresponding PCT/CZ/02/00055.

* cited by examiner

*Primary Examiner*—Terressa M Boykin
(74) *Attorney, Agent, or Firm*—Buchanan Ingersoll & Rooney PC

(57) ABSTRACT

A method for processing polyester wastes, especially used polyester bottles, which comprises shredding, washing, drying and melting the waste mixture to obtain a starting raw material wherein a modifying agent selected from the group comprising a combination of polysiloxane and a plasticizer selected from the group of phthalates, or a combination of silazanes and silanes is added to the shredded and dried waste mixture, the amount of the modifying agent being 4 to 6% by weight, based on the waste mixture.

6 Claims, No Drawings

METHOD FOR PROCESSING POLYESTER WASTES

TECHNICAL FIELD

The present invention relates to a method for processing polyester wastes, especially used polyester bottles, comprising shredding, washing, drying and melting the waste mixture to obtain a starting raw material. The wastes include materials based on polyethylene terephthalate, commonly known as PET, especially known from packaging technology, for example so called PET bottles. The starting recycled raw material is most often in the form of a granulate.

DESCRIPTION OF THE PRIOR ART

Polyesters belong to best known and most common materials, showing no adverse health effects, used for instance in the packaging industry, film manufacture, copying technology etc. Apparently, the most commonly used type of polyesters is polyethylene terephthalate (PET) and the most significant source for processing PET wastes are used packaging materials.

The most environmentally acceptable way of the disposal of used polyester packages is of course their recycling the aim of which is to obtain useful materials, as much as possible usable for original applications. Recycling processes, e.g. processes used for processing used PET bottles include several operations, namely shredding the wastes, washing, drying the shred and its subsequent melting, usually to form a granulate which is a starting raw material for the manufacture of finished products-packages, using extrusion or injection moulding machines. The manufacture of the granulate in this way is accompanied by undesirable phenomena such as the oxidation and hydrolysis of polyester macromolecules, which may in turn result, during the further processing of the recycled raw material, in obtaining either a higher proportion of wastes, or final products having lower quality. The undesirable properties of the final products may include the yellow tinge of clear moulds. Another undesirable property may be an increased level of $CO_2$ permeability and an increased content of low-molecular fractions, including aldehydes, in the recycled raw material. Such fractions are transferred from the raw material into the packaging products and impair their usability.

In order to eliminate such shortcomings and to secure production of high-quality packaging materials for foodstuffs, it has been necessary to use further specialized procedures. Such procedures are mostly very complex and in any case they mean a substantial increase in the costs of the manufacturing process.

For instance, according to the U.S. Pat. Nos. 5,395,858 and 5,580,905, the recycling process includes the conversion of polyesters to the original starting chemical compounds. Polyester materials are mixed with an alkaline mixture and while exposed to high temperatures they are transformed to alkaline salts by saponification. In this way, various contaminants as well as organic and inorganic compounds are eliminated from the waste. Nevertheless, this process is considerably demanding both from the technological and economical points of view.

In the Czech patent application PV 2001-926 a process for the purification of shredded polyester by heating it in an anhydrous environment of an alkaline mixture which has been dried in advance wherein the polyester is partly saponified but not melted, which makes possible the subsequent physical purification and removal of impurities, is disclosed. Similarly to the process mentioned above, even this process is a multistep process which includes the use of alkaline materials in the form of alkaline hydroxides.

The aim of the invention is to provide a method which would be capable of transforming used PET bottles, especially by shredding and further processing such polyester wastes, to form a raw material useful for the manufacture of high-quality packaging materials for foodstuffs, without the necessity of using any complex or costly procedures during the preparation of the recycled starting raw material.

SUMMARY OF THE INVENTION

The subject matter of the invention is a method for processing polyester wastes, especially used polyester bottles, which comprises shredding, washing; drying and melting the waste mixture to obtain a starting raw material, characterized by adding a modifying agent selected from the group comprising a combination of polysiloxane and a plasticizer selected from the group of phthalates, or a combination of silazanes and silanes to the shredded and dried waste mixture wherein the amount of the modifying agent is 4 to 6% by weight, based on the waste mixture.

In a preferred embodiment a modifying agent selected from the group comprising a combination of polyhydrosiloxane and a plasticizer selected from the group of dioctylphthalate, dinonylphthalate, dibutylsebacate, or a combination of hexamethyldisilazane and tetraethoxysilaneis is added to the shredded and dried waste mixture wherein the amount of the modifying agent is 4 to 6% by weight, based on the waste mixture.

A further embodiment includes the following more specific features: the modifying agent contains 20 to 30% by weight of liquid polyhydrosiloxane and 70 to 80% by weight of a plasticizer selected from the group of dioctylphthalate, dinonylphthalate, dibutylsebacate, or 55 to 65% by weight of hexamethyldisilazane and 35 to 45% by weight of tetraethoxysilane.

The modifying agent is added to the waste mixture in a reactor-mixer at a temperature of 130±5° C. and then the waste mixture is subjected to stirring for 50 to 100 minutes.

The waste mixture is processed to form a granulate advantageously at a temperature of 240 to 250° C.

By the claimed process the increased resistance of the recycled waste polyester against its destruction caused by oxidation and hydrolysis and the improvement of the time necessary for processing are achieved while maintaining the basic parameters on a level comparable to the polyester processed by standard methods. At the same time, the elimination of the undesired harmful fractions and the reduction of the gas permeability of the final products take place.

Unlike standard types of raw materials, the resulting starting raw material shows better elasticity while maintaining the required strength, better heat stability and a higher crystallization temperature, up to 110° C.

EXAMPLES OF THE INVENTION

Example 1

10 kg waste polyester bottles were shredded in a shredder, washed in a scrubber and the resulting waste mixture was dried in a dryer. The waste mixture was charged in the reactor-mixer and heated to a temperature of 130±5° C. At this temperature a modifying agent, in an amount of 400 g, was added to the reactor. The modifying agent had the following composition: 25% by weight of liquid polyhydrosiloxane and 75% by weight of dioctylphthalate, as a plasticizer. Then, the mixture was stirred at the same temperature for 60 minutes. The resulting waste mixture was then processed in an extruder at a temperature within the range of 240 to 250° C. to form a granulate. The resulting granulate was dark grey and showed a high level of lustre.

Example 2

10 kg waste polyester packages were shredded in a shredder, washed in a scrubber and the resulting waste mixture was dried in a drier. The waste mixture was charged into a reactor-mixer and heated up to a temperature of 130° C.±5° C. At this temperature, a modifying agent, consisting of 60% by weight of hexamethyldisilazane and 40% by weight of tetraethoxysilane, in an amount of 400 g was added to the reactor. Then, the mixture was stirred at the same temperature for 60 minutes. The resulting waste mixture was then processed in an extruder at a temperature within the range of from 240 to 250° C. to form a granulate. The resulting granulate was clear and showed a high level of lustre.

In comparison to a standard product, the raw materials obtained in both these cases showed increased elasticity while maintaining the required strength, better heat stability and a higher crystallization temperature, up to 110° C.

INDUSTRIAL APPLICABILITY

The method according to the invention can be used in a process for recycling polyester wastes, especially the so called PET bottles, to form a quality standard raw material which may be useful, among other applications, for manufacturing packages for foodstuffs and other products.

The invention claimed is:

1. A method for producing a modified polyester from waste processed polyester comprising:
    1) shredding, washing, and dying waste processed polyester material;
    2) adding a modifying agent mixture comprising:
        a) hexamethyldisilazane;
        b) tetraethoxysilane; and
        wherein the modifying agent mixture is added in an amount of 4% to 6% by weight of the waste polyester;
    3) heating the resulting mixture to obtain a melt; and
    4) recovering a modified polyester.

2. The method of claim 1, wherein the modifying agent comprises 55 to 65% by weight of hexamethyldisilazane and 35 to 45% by weight of tetraethoxysilane.

3. The method of claim 1, wherein the modifying agent mixture is added to the waste polyester at about 130° C., and the obtained polyester mixture is stirred for 50 to 100 minutes.

4. The method of claim 1, wherein the melt is obtained by heating the polyester mixture to 240 to 250° C.

5. The method of claim 4, wherein the modified polyester is further processed to obtain a granulate.

6. The method of claim 1, wherein the resulting modified polyester has a crystallization temperature of about 110° C.

* * * * *

UNITED STATES PATENT AND TRADEMARK OFFICE
CERTIFICATE OF CORRECTION

| | | |
|---|---|---|
| PATENT NO. | : 7,491,751 B2 | Page 1 of 1 |
| APPLICATION NO. | : 10/515012 | |
| DATED | : February 17, 2009 | |
| INVENTOR(S) | : Viktor Bulgakov et al. | |

It is certified that error appears in the above-identified patent and that said Letters Patent is hereby corrected as shown below:

Claim 1, column 4, line 7, change "dying" to --drying--.

Signed and Sealed this

Fifth Day of May, 2009

JOHN DOLL
*Acting Director of the United States Patent and Trademark Office*